(12) United States Patent
Pincus

(10) Patent No.: US 6,885,288 B2
(45) Date of Patent: Apr. 26, 2005

(54) METHOD AND APPARATUS FOR ACCESSING MEDICAL ASSET DATA

(75) Inventor: David Pincus, Milwaukee, WI (US)

(73) Assignee: GE Medical Technology Services, Inc., Pewaukee, WI (US)

( * ) Notice: Subject to any disclaimer, the term of this patent is extended or adjusted under 35 U.S.C. 154(b) by 348 days.

(21) Appl. No.: 09/682,236

(22) Filed: Aug. 8, 2001

(65) Prior Publication Data
US 2003/0032416 A1 Feb. 13, 2003

(51) Int. Cl.$^7$ .................................................. H04Q 5/22
(52) U.S. Cl. .............................. 340/10.51; 340/539.12; 340/539.19; 340/870.07
(58) Field of Search ............................ 340/825.36, 539, 340/10.33, 10.51, 539.12, 539.13, 539.19, 539.1, 825.49, 870.07; 126/110 R

(56) References Cited

U.S. PATENT DOCUMENTS

| | | | | |
|---|---|---|---|---|
| 4,561,422 A | * | 12/1985 | Hara et al. ............... | 126/110 R |
| 5,894,266 A | * | 4/1999 | Wood et al. ............ | 340/539.17 |
| 5,959,529 A | * | 9/1999 | Kail, IV ................. | 340/539.12 |
| 6,130,602 A | * | 10/2000 | O'Toole et al. .......... | 340/10.33 |
| 6,720,866 B1 | * | 4/2004 | Sorrells et al. ............. | 340/10.4 |

* cited by examiner

Primary Examiner—Edwin C. Holloway, III
(74) Attorney, Agent, or Firm—Fletcher Yoder

(57) ABSTRACT

A wireless communication system to obtain data from a medical asset, such as mobile equipment. The system utilizes a transmitter coupled to a programmable interface. The programmable interface is, in turn, coupled to a device associated with the asset. The device or application communicates data about the asset to the interface. The interface is programmed by a user to communicate with the device and couple the data to the transmitter in a configuration selected by the system user. The transmitter is operable to transmit the information to one or more antennas of the wireless communication system. The information from the antennas is coupled to a cell controller and to an information system.

28 Claims, 4 Drawing Sheets

METHOD AND APPARATUS FOR ACCESSING MEDICAL ASSET DATA

BACKGROUND OF INVENTION

The present invention relates generally to a wireless tracking network and, more specifically, to a system and method for using a wireless tracking network to communicate medical asset data.

Wireless tracking networks (WTN) enable a person or object located within a building or area to be located and tracked. A typical WTN uses a radio frequency (RF) transmitter, known as an RF tag, antennas, and a cell controller. The RF tag is attached to the object to be tracked. The antennas transmit an RF signal to the RF tag. The RF signal transmitted by the antennas is used by the RF tag to transmit a signal back to the antennas. The RF tag transmits its signal at a different frequency to enable the WTN to differentiate between the two signals. The signal transmitted by a transponder may include an identifier to enable the WTN to identify the specific RF tag providing the signal. One or more antennas may receive the signal from a RF tag. The antennas couple the re-transmitted signal to the cell controller. The cell controller calculates the time between when the signal was transmitted by the antenna and when the signal transmitted by the RF tag was received by the antenna. With this information, the distance from an antenna to the RF tag can be calculated. By calculating the distance of the RF tag from several different antennas, the WTN can identify the specific location of the RF tag, and, therefore, the person or object to be tracked.

When used in medical institutions, a WTN and RF tags are used to locate medical assets, such as wheelchairs, gurneys, and other pieces of moveable equipment within the medical institution. The WTN enables the medical institution to more effectively utilize it assets. This is especially desirable in locating assets, such as wheelchairs, that are moved frequently and deposited about the medical institution. The WTN and RF tags enable desired, or lost, assets to be located quickly and without having to resort to labor-intensive searches of the facility. Additionally, the WTN and RF tags enable the medical institution to maintain an optimal inventory of assets by enabling the medical institution to locate unused assets and put them into service.

In addition to the location of a specific asset, the WTN can be used to transmit other information about the asset. For example, RF tag systems can be configured to transmit operating information from an asset. However, each type of asset, typically, uses its own communication protocol, or data format, and each RF tag, or an interface associated with each tag, has been made to configure specifically with each of these assets. Moreover, the operating information that can be transmitted by the RF tag is fixed by the manufacturer at the time the RF tag is manufactured. An RF tag that could be sold by a manufacturer and configured by a system user to transmit asset data in a form desired by the system user has been unavailable. The present technique may address one or more of the problems set forth above.

SUMMARY OF INVENTION

The present invention provides a data acquisition technique designed to respond to these needs. The technique may be applied in a wide variety of settings, but is particularly well suited to acquiring data from mobile equipment, such as medical diagnostic systems, monitors, wheelchairs, gurneys and other equipment located in a medical facility. In a particularly exemplary embodiment, a wireless communication system is used to obtain data from an asset, such as a piece of mobile equipment. The system utilizes a transmitter coupled to a programmable interface. The programmable interface is, in turn, coupled to a device, sensor, or application that is associated with the asset. The device or application communicates data about the asset to the interface. The interface is programmable to enable the interface to communicate data from the device to the transmitter in a user configurable format. The transmitter is operable to transmit the information to one or more antennas of the wireless communication system.

DETAILED DESCRIPTION

Figure 1:
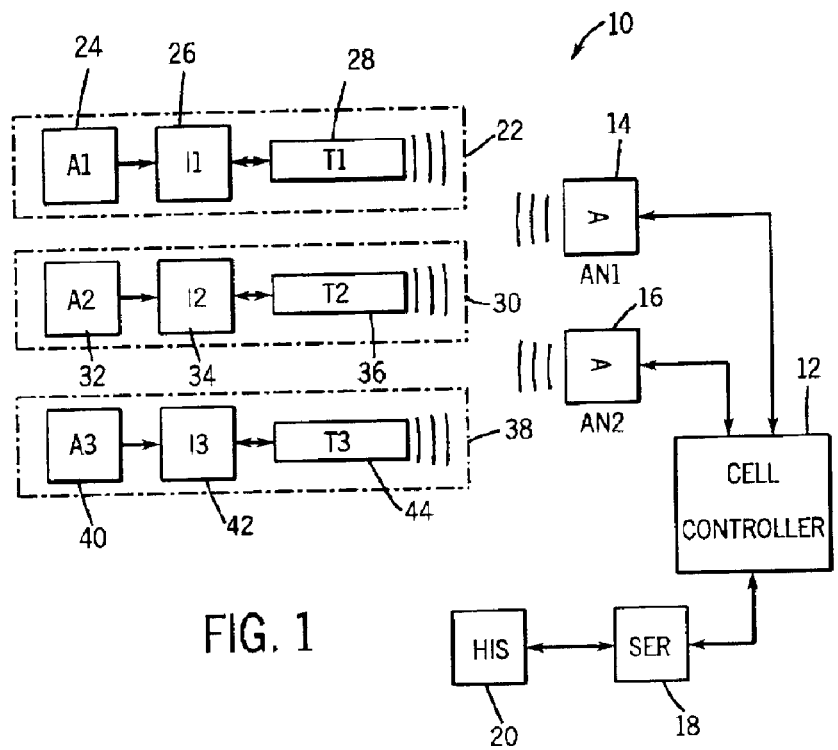
FIG. 1 is a diagrammatical representation of a wireless tracking network, according to an exemplary embodiment of the present invention.

Referring now to FIG. 1, a wireless tracking network (WTN) 10 is featured. The WTN 10 is operable to locate a specific asset and to provide an indication of at least one operating parameter of the asset. In the illustrated embodiment, the WTN comprises a cell controller 12, a first antenna 14, a second antenna 16, and a server 18 to couple the cell controller 12 to a hospital information system (HIS) 20. In this embodiment, the WTN is used to track a plurality of assets and to obtain asset operating parameter data from each of the assets. For example, a hospital employee may access the HIS 20 and determine whether the asset is currently being used, and how much and where the asset has been used in the past. Examples of assets include: wheelchairs, gurneys, and portable electronic equipment.

In the illustrated WTN, a first asset 22 has a first device, sensor or application 24 that is operable to provide an indication of at least one asset operating parameter. For example, the first device 24 may be an electronic sensor that is operable to detect when a person is sitting in a wheelchair and to provide a signal to indicate that asset operating parameter. The first device 24 uses a first communication protocol, or data format, to communicate the asset operating parameter. The first device 24 communicates the asset operating information to a first interface 26. The first interface 26 is programmable to communicate with electrical devices using different communication protocols. In this application, the first interface 26 has been programmed to enable the first interface 26 to communicate with the first device 24 using the first communication protocol.

In the illustrated embodiment, the first interface 26 is electrically coupled to a first RF transmitter 28, such as a RF tag. The first RF transmitter 28 may be a transponder powered by the energy received from the signal transmitted by the antennas. Alternatively, the first RF transmitter may have a battery to supplement the energy received by the antennas. Other methods of wirelessly communicating data could be used, such as a completely battery powered transmitter or transceiver. Additionally, frequencies other than radio frequencies may be used to transmit data. The first RF transmitter 28 may, or may not, communicate using a different communication protocol than the first communication protocol used by the first device 24. However, the programming provided to the first interface 26 enables the first device 24 to communicate with the first RF transmitter 28. The first interface 26 couples asset operating parameters, such as the status of a wheelchair, from the first device 24 to the first RF transmitter 28. In this embodiment, the first RF transmitter 28 receives a signal from the first or second antennas and re-transmits a signal containing the asset operating information back to the first and second antennas. The first RF transmitter 28 also transmits a unique identifier with the asset operating information to enable the WTN to identify the signal as coming specifically from the first RF transmitter 28. Preferably, both antennas receive the re-transmitted signal from the RF transmitter 28 so that, when desired, the WTN 10 may triangulate the position of the RF transmitter 28 from the known positions of the two antennas.

In the illustrated embodiment, the WTN 10 is also used to track a second asset 30. The second asset 30 has a second device, sensor or application 32 that also provides an indication of at least one asset parameter. For example, the second device 32 may communicate the data from a patient monitor, such as a heart monitor. In this embodiment, the second device 32 uses a second communication protocol, different from the first communication protocol, to communicate data. The second device 32 communicates the patient monitor data to a second programmable interface 34. The second interface 34 is the same type of interface as the first interface 26 but has been programmed, in this instance, to communicate with the second application 32 using the second communication protocol. The programming provided to the second interface 34 also enables the second device 32 to communicate with a second RF transmitter 36. The second interface 34 couples the patient monitor data from the second application 32 to the second RF transmitter 36, which transmits the data.

In this embodiment, the WTN 10 also receives operating information from a third asset 38. The third asset 38 also has a third device, sensor or application 40 that provides an indication of at least one asset operating information. For example, the third device 40 may be coupled to a piece of diagnostic equipment, such as an imaging station, to indicate how often, and for how long each day, the diagnostic equipment is used. The third device 40 uses a third application protocol to communicate asset data. A third interface 42 is programmed to communicate with the third application 40 using the third application protocol. The third interface 42 has been programmed to communicate with the third application 40 using the third communication protocol and with a third RF transmitter 44. The asset data is coupled by the third interface 42 to the third transmitter 44 for transmission.

Figure 2:
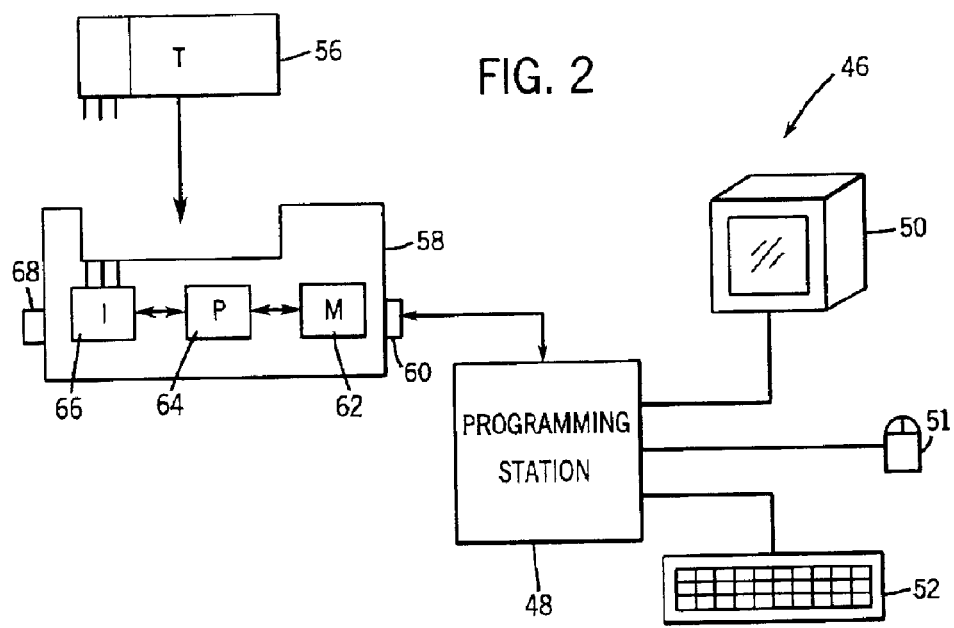
FIG. 2 is a diagrammatical representation of a programming station for programming a programmable RF tag mount.

As discussed above, the programmable nature of the interface enables one type of interface to be used with applications using different communication protocols. Referring generally to FIG. 2, a programming system 46 is used to enable a WTN operator, such as a hospital employee, to program a common programmable interface for use with a variety of different assets and RF transmitters. In the illustrated embodiment, the programming system 46 utilizes a programming station 48 to program an interface. The programming station 48 provides the interface with the programming instructions to enable the interface to communicate with a device, sensor or application. An operator uses a monitor 50, a keyboard 52 and a mouse 54 to direct the operation of the programming station 48. In an exemplary embodiment, the programming system 46 has a database of devices with which the interface can be programmed to communicate. In operation, an operator selects a device from the database and the programming station then programs the interface with the appropriate programming to communicate with that desired device. In an alternative embodiment, the programming system has a database of communication protocols. An operator selects the communication protocol to be used and the programming station then programs the interface with the appropriate programming to enable the interface to communicate using the selected protocol.

In this embodiment, the RF transmitter is an RF tag 56 and the interface is housed in a separate programmable base 58. The base 58 can be physically secured to an asset, if desired. The programming station 48 is coupled to the programmable base 58 to program the interface. The programmable base 58 has an electrical connector 60, such as an RS-232 port, to enable the programming station 48 to connect to the programmable base 58. In the illustrated embodiment, each base 58 has a memory 62, a processor 64, and an RF transponder interface 66, such as a T30 data interface. The memory 62 is used to store programming downloaded from the programming station 48. The processor 64 executes the programming stored in memory 62. Alternatively, a programmable processor, or some other device, may be used to store the information downloaded from the programming station 48. The RF transponder interface 66 electrically couples the RF transponder 56 to the base 58. The programmable nature of the base 58 enables the base 58 to be programmed for use with a device, sensor, or application using one communication protocol and then reprogrammed for use with a second device, sensor, or application using a different communication protocol.

Alternatively, the base 58 may be programmed with information to enable the base 58 to communicate using a variety of different protocols. In this situation, the base 58 may be configured to identify the protocol being used by the application and then communicate with the application using that protocol. Additionally, programmable base 58 has a second electrical connector 68, such as a DB9 connector, a DIN connector, an RJ11 telephone jack, etc., to couple the base 58 to a device or sensor.

In this embodiment, the programmable base 58 is operable to receive the data from an asset, process the asset data, and then communicate the processed data to the RF tag 56. In an exemplary present embodiment, in addition to, or instead of, providing an indication of whether or not a device is currently in operation (i.e. device status), an interface could be used to report the total number of hours that a device has been operated. The interface could monitor an operating signal from the device at defined intervals to determine if the asset is operating or present. If the asset is on or present for at two consecutive intervals, then the asset may be presumed to have been operating or present for the entire interval. That information can then be added to an existing cumulative total of hours of operation to obtain a new cumulative total of hours of operation.

Maintaining a cumulative total prevents a complete loss of asset operating or presence data during periods when the asset is out of contact with the WTN 10. For example, if the interface and transmitter are only communicating current asset operating information, the antennas will not receive that information when the device is outside of the range of the antennas. However, a cumulative total of data retains the asset operating information during the periods of time when the device is outside the range of the WTN 10 and transmits the information once the asset is brought back within the range of the WTN 10.

A variety of different methods may be envisioned for maintaining monitored and total data. For example, the asset data may be monitored and compared to defined ranges of asset data. A cumulative total of each time the data falls within each range may then be maintained. Alternatively, a counter may be used to generate a temporal reference for the asset data monitored at periodic intervals. Each monitored asset parameter is then given a count number as a reference. The count and asset data that was not received by an antenna when the asset was out of range could be retrieved when the device is back in range. Indeed, the interface could be used to record the asset data, at least for a short period of time, for later retrieval by the programming station.

Figure 3:
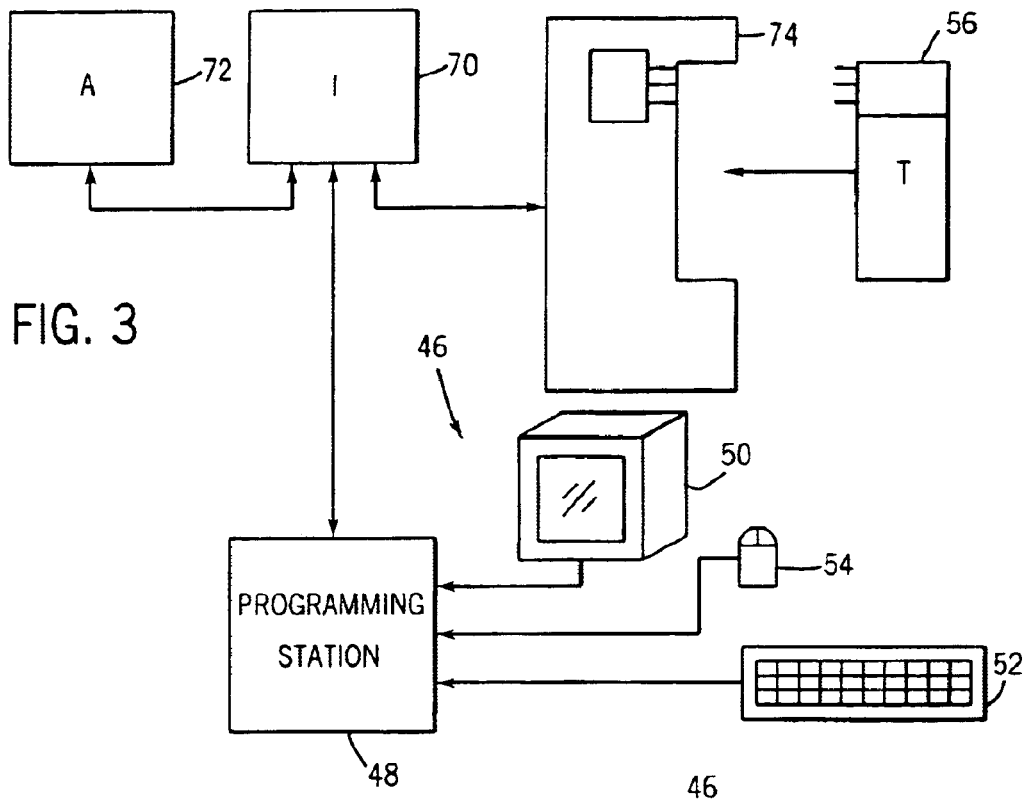
FIG. 3 is a diagrammatical representation of a programming station for programming a programmable interface between an asset and a RF tag mount, according to an alternative embodiment of the present technique.

Referring generally to FIG. 3, an alternative embodiment is illustrated of a programmable interface 70 that is separate from a base. The programmable interface 70 may be part of an asset or a completely separate device. In this embodiment, the programmable interface 70 is coupled to a device, sensor or application 72 and to a non-programmable base 74 housing a RF tag 56. Programming system 46 is coupled to programmable interface 70 to provide the programming to enable the interface 70 to communicate with the asset 72, the base 74 and, ultimately, RF tag 56. If the programmable interface 70 is a part of an asset, the interface 70 provides the asset with the ability to communicate with a plurality of different communication devices. Alternatively, if the interface 70 is a stand-alone device, it enables existing non-programmable devices, both assets and RF transmitters, to be programmed to communicate with devices using different communication protocols.

Figure 4:
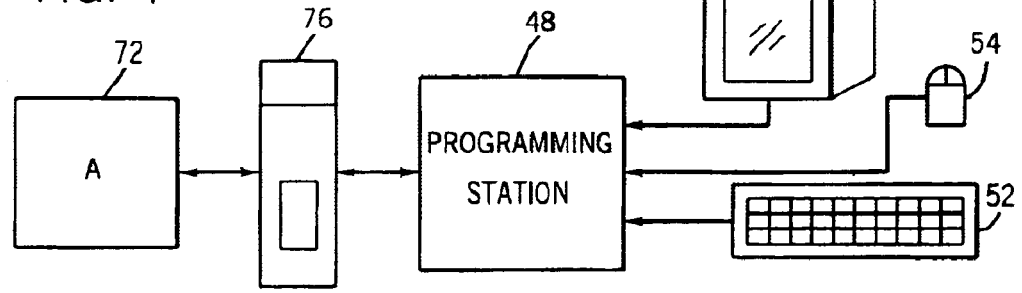
FIG. 4 is a diagrammatical representation of a programming station for programming a programmable RF tag, according to a further alternative embodiment of the present technique.

Referring generally to FIG. 4, another alternative embodiment of a transmitter and programmable interface is illustrated. In this embodiment, the transmitter and interface are incorporated into a single unit 76. Programming system 46 is coupled to the single unit 76 to provide the programming to enable the unit 76 to communicate with a device, sensor, or application 72.

Figure 5:
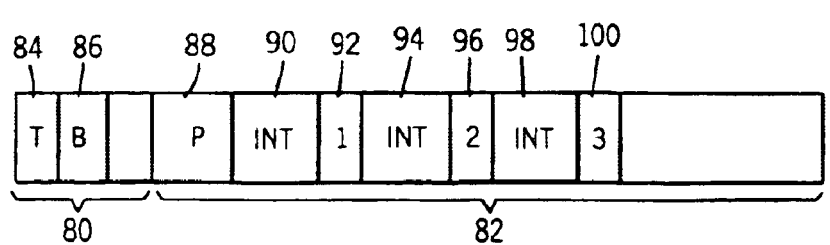
FIG. 5 is a diagrammatical representation of a data stream provided by a cell controller, according to an exemplary embodiment of the present technique.

As discussed above in regard to FIG. 1, a transmitter receives a signal from the first or second antennas and re-transmits a signal containing at least one asset parameter back to the first and second antennas. Preferably, both the first and second antennas receive the re-transmitted signal from the transmitter. The antennas couple the information received from the transmitters to the cell controller 12. Referring generally to FIG. 5, in a presently contemplated embodiment, each RF transmitter transmits a stream of data 78 comprised of a plurality of data bits transmitted according to a communication protocol. Typically, an excess of data bits is present in the data stream. The excess data bits may consist of dummy or available characters that represent no useful data. In a non-programmable system, the data stream to be communicated is typically fixed and defined by a manufacturer.

In the illustrated embodiment, the data stream 78 has a non-customizable portion 80 and a user customizable portion 82. The non-customizable portion 80 contains data that generally is not altered by a user. For example, a portion 84 of the data stream 78 contains a reference identifier to identify the specific RF tag that is providing the data stream 78. In this embodiment, a second portion 86 of the non-customizable portion 80 of the data stream 78 indicates whether or not the battery is low. Additional non-customizable data also may be transmitted. The number and types of data found in the non-customizable portion may vary for a number of reasons, such as the asset being monitored and the needs of the user. In this embodiment, a first portion 88 of the user customizable portion 82 indicates the number of user customizable parameters that are to be provided by the data stream 78. This enables the system to know what portion of the data stream has useful information and what portion has unutilized bits. In the illustrated embodiment, data from the asset (e.g. presence or status) is monitored and processed at periodic intervals. A second portion 90 of user customizable data 82 represents the interval at which data is monitored and processed. A third portion 92 represents a running total of the data. In this embodiment, the fourth portion 94 and fifth portion 96 represent the interval and the running total for a second asset operating parameter. The sixth portion 98 and seventh portions 100 represent the interval and the running total for a third asset operating parameter.

The data comprising the data stream 78 may be used for a wide variety of analysis and tracking functions. For example, the data may be used not only in locating a specific asset, but to identify how often and for how long an asset is operated, as well as the locations within a facility where the asset is operated. Additionally, the data can be used to indicate when an asset is being removed from a facility and provide an alert to a system operator. The data may also be used to provide other alerts to a system operator. For example, the data may be used to provide a warning when an asset parameter is approaching an operating limit or when a monitor indicates an abnormal condition.

Figure 6:
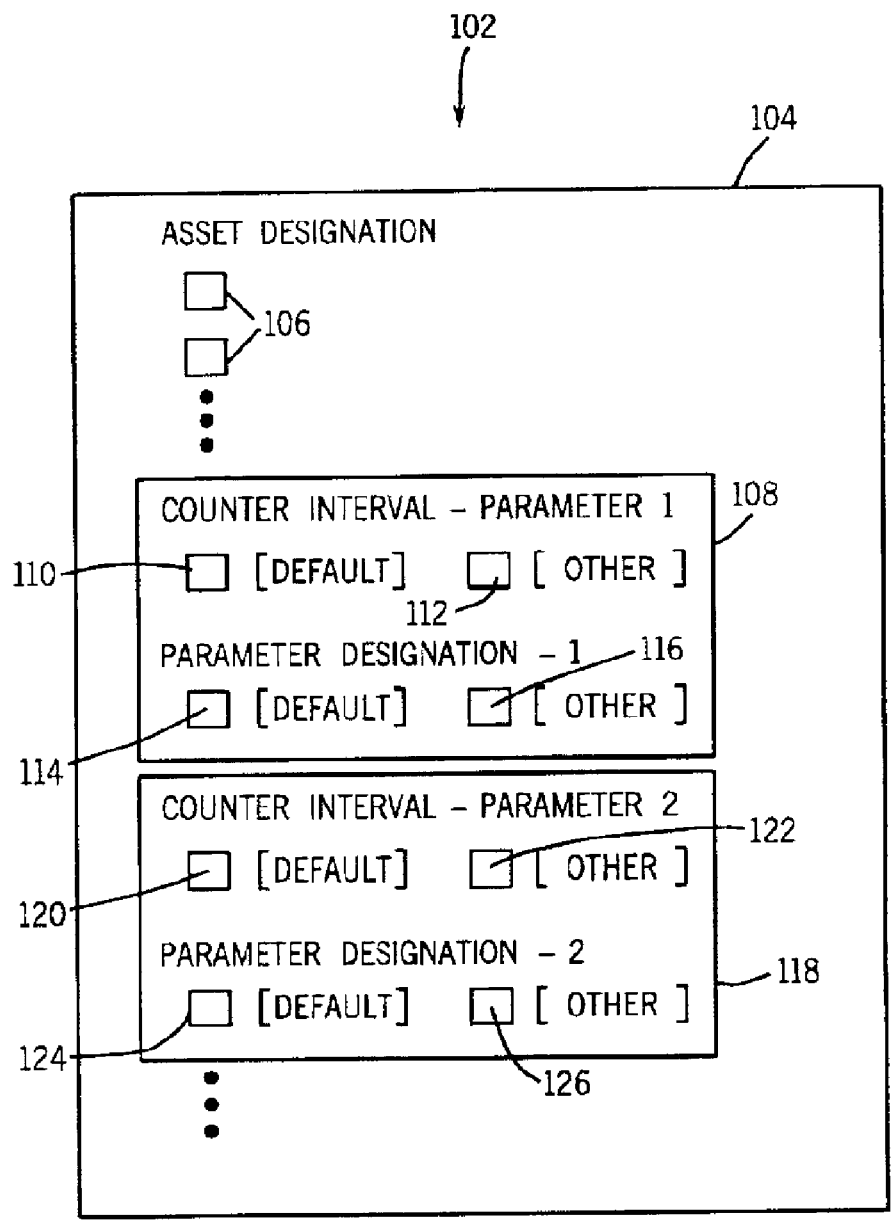
FIG. 6 is a representation of a programming station visual display, according to an exemplary embodiment of the present technique.

As discussed above, the programming station is operable to program a programmable interface for operation with a variety of different assets. Referring generally to FIG. 6, an embodiment of a visual display 102 on the monitor 50 of the programming system 46 is illustrated. In this embodiment, a selection 104 of assets is visually displayed to a user. Each of these assets may use different communication protocols. Each asset has a virtual box 106 located adjacent to the name of the asset. The specific asset to be used with the programmable interface is chosen by selecting the box 106 adjacent to the name of the asset. In this embodiment, each box 106 is selected by placing a cursor over the box and clicking with the mouse. The programming is then provided to the interface via the programming station 48.

Additionally, the programming station operates to configure the data stream employed by the interface. In the illustrated embodiment, asset parameter information for a first parameter is provided in a first window 108. A user desiring to set the counter interval period for providing data to a standard default setting would select the selection box 110 marked as "DEFAULT." Alternatively, a user desiring to program the interval asset to a different interval, or reset the cumulative total, would select the box 112 marked as "OTHER." Additionally, a user desiring to set the parameter designation to a default setting would select the box 114 marked as "DEFAULT." Alternatively, a user desiring to program the parameter to a different designation would select the box 116 marked as "OTHER." Asset parameter information for a second asset parameter is provided in a second window 118. A user desiring to set the counter interval for the second parameter to a default setting would select the selection box 120 marked as "DEFAULT." Alternatively, a user desiring to program the interval asset to a different interval, or reset the cumulative total, would select the box 122 marked as "OTHER." Additionally, a user desiring to set the parameter designation for the second asset parameter to a default setting would select the box 124 marked as "DEFAULT." Alternatively, a user desiring to program the second parameter to a different designation would select box 126 marked as "OTHER." Additionally, an asset may be configured to allow an interface to input information to the asset. In this event, the programming station may be configured to program the interface with instructions to direct the operation of the asset.

It should be noted that, where several parameters are monitored, their configurations and intervals may be different. The present technique enables a system user to configure the parameter data to meet the user's needs, rather than limiting the user to the configuration established by the manufacturer during the initial manufacture of an RF tag. Additionally, the present techniques enables the parameter data to be reconfigured, if desired.

Figure 7:
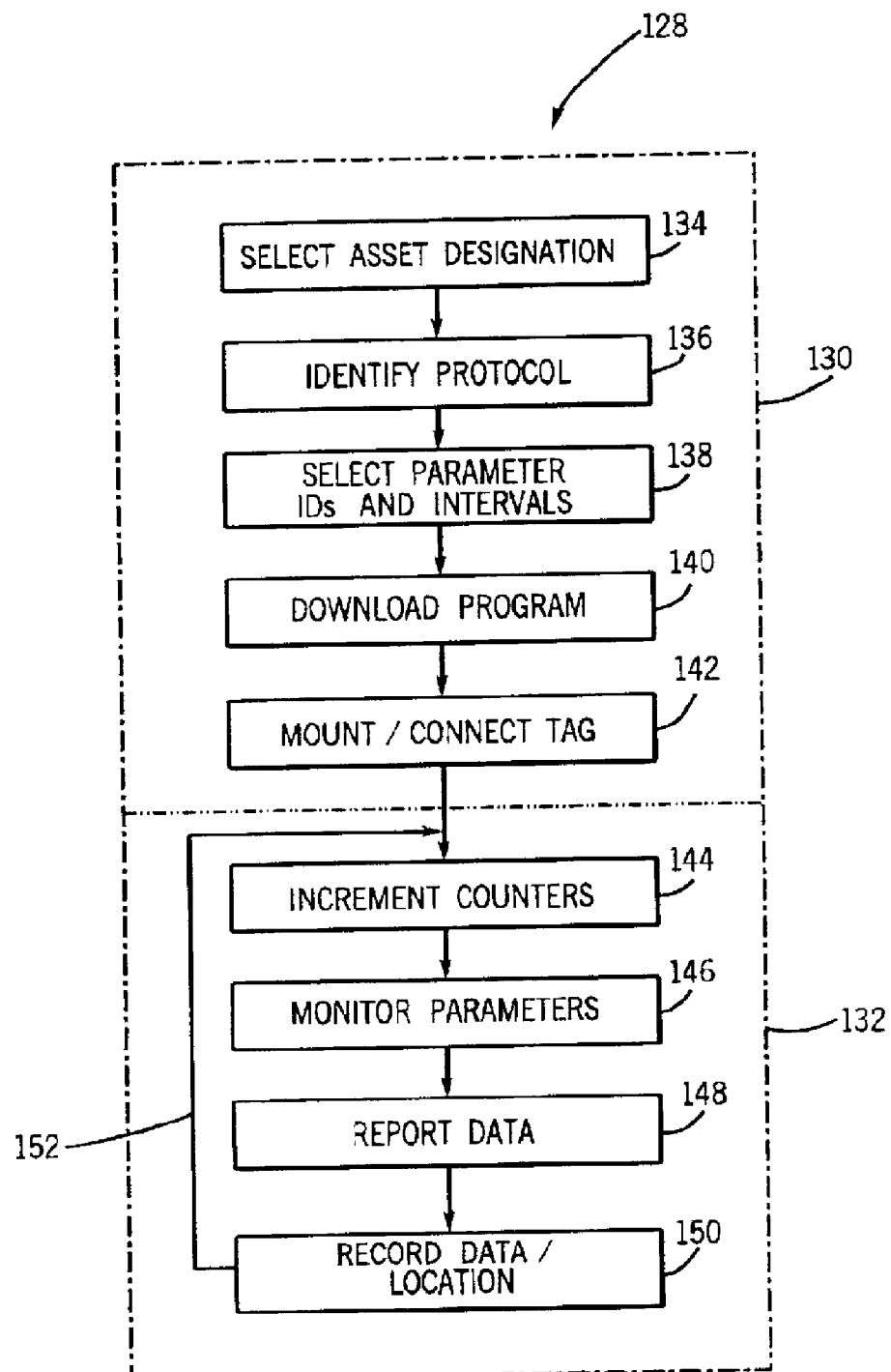
FIG. 7 is a block diagram of a process for operating a wireless tracking network, according to an exemplary embodiment of the present technique.

Referring generally to FIG. 7, a block diagram of a process 128 of operating a WTN is illustrated. In the illustrated diagram, the process is divided into a first portion, as referenced by block 130, that represents the steps leading up to placing a transmitter and interface in operation and a second portion, as referenced by block 132, that represents the operation of the interface and transmitter in transmitting asset data. In the illustrated process, an asset is selected by its designation, as represented by block 134. Next, the communication protocol for the asset is identified from the asset designation, as represented by block 136. In this embodiment, a specific parameter from among a plurality of parameters is elected and its monitoring interval established, as referenced by block 138. The programming instructions are then downloaded to the programmable interface, as represented by block 140. The transmitter and/or programmable interface are then mounted or coupled to the asset, as represented by block 142, if not already done.

In the illustrated process, the programmable interface increments an interval counter, as represented by block 144. The asset operating parameters are monitored according to the interval selected for that parameter in block 138, as represented by block 146. The programmable interface then communicates the data to the transducer for reporting to the antennas of the WTN, as represented by block 148. The asset operating data and the location of the asset are then recorded by the WTN, as represented by block 150. The process of incrementing, monitoring, reporting, and recording is continuously repeated, as represented by arrow 152.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. For example, a wide range of assets and asset date parameters may be serviced with the present technique. Such assets may include wheelchairs, portable electronic equipment, and fixed equipment, such as pumps and motors. This list is not, of course, intended to be all inclusive. Moreover, depending, upon the asset and the data of interest, may different parameters may include occupancy of a bed or wheelchair, status (e.g. "on" or "off") of a device, in addition to actual values of parameters, such as flow rates, device settings, fluid cycles, and so forth.

What is claimed is:

1. A wireless communication system, comprising:

a programmable interface coupleable between a sensing device and a transmitter, wherein the interface is operable to receive sensing device data from the sensing device and to be programmed to process the sensing device data at a desired periodic interval to maintain a running total of a desired parameter and to provide the running total of the desired parameter and the desired periodic interval the transmitter for transmission; and a programming station selectively coupleable to the interface to enable a user to program the interface to establish the desired interval.

2. The system as recited in claim 1, wherein the sensing device data comprises operational data of the device.

3. The system as recited in claim 1, wherein the desired parameter comprises operational data of the device that is processed by the interface in response to programming provided by the programming station.

4. The system as recited in claim 3, wherein the running total of the desired parameter comprises a sum of operational data of the device received by the interface from the sensing device taken at each desired periodic interval.

5. The system as recited in claim 4, wherein the programming station enables the wireless communication system user to reset the sum.

6. The system as recited in claim 1, wherein the programming station comprises a computer system coupleable to the interface.

7. The system as recited in claim 6, further comprising a cell controller and an antenna.

8. The system as recited in claim 7, wherein the cell controller is coupled to the computer system.

9. The system as recited in claim 1, wherein the transmitter is a transponder.

10. An interface for a wireless communication system, comprising:

a processor, wherein the processor is operable to receive device data from a device and to process the device data at a desired interval according to programming instructions stored in the interface to provide a user-configured stream device data to a transmitter, wherein the user-configured stream of device data comprises a first portion of data representative of the device data processed by the interface and a second portion of data representative of the desired interval.

11. The interface as recited in claim 10, wherein the processor is operable to process the device data received from the device, further wherein at least a portion of the user-configured stream of device data comprises data processed by the interface.

12. The interface as recited in claim 10, wherein the interface is programmable to enable a user to provide programming to the interface to direct the operation of the interface.

13. The interface as recited in claim 12, wherein the interface is coupleable to a programming station, the programming station being operable to provide the interface with programming to enable the processor to communicate with the device using a first communication protocol and with the transmitter using a second communication protocol.

14. The interface as recited in claim 12, wherein the interface is operable to be programmed to communicate with a first device using a first communication protocol and then re-programmed to communicate with a second device using a different communication protocol.

15. The interface as recited in claim 10, wherein the device data comprises device operating data.

16. The interface as recited in claim 15, wherein the interface is operable to enable a user to select desired device operating data to be provided to the transmitter.

17. The interface as recited in claim 10, wherein at least a portion of the user-configured stream of device data is an ongoing count of a device operating parameter.

18. The interface as recited in claim 10, wherein the interface comprises a first electrical connector configured for mating engagement with a first external electrical connector coupled to a programming system.

19. The interface as recited in claim 18, wherein the interface comprises a second electrical connector configured for mating engagement with a second external electrical connector coupled to the device.

20. The interface as recited in claim 10, wherein the transmitter is a transponder.

21. The interface as recited in claim 19, wherein the interface comprises a third electrical connector configured for mating engagement with the transmitter.

22. A method of operating a wireless communication system to enable a system user to configure device data communicated by a transmitter coupled to a sensing device via a programmable interface, comprising the acts of:
   connecting the programmable interface to a programming station operated by a system user;
   identifying a communication protocol utilized by the sensing device from among a plurality of communication protocols operable to be programmed into the programmable interface;
   operating the programming station to configure the programming of the programmable interface to receive the device data from the sensing device using the communication protocol utilized by the sensing device and to provide a user-configured stream of device data to the transmitter; and
   coupling the programmable interface between the sensing device and the transmitter.

23. The method as recited in claim 22, further comprising the act of transmitting a unique identifier for the transmitter with the data from the device.

24. The method as recited in claim 22, further comprising:
   reconnecting the programmable interface to the programming station; and
   operating the programming station to reconfigure the programming of the programmable interface to provide the device data in a different user selected configuration.

25. A method of operating a wireless communication system to enable a system user to configure data communicated from a medical asset by a transmitter, comprising the acts of:
   connecting a programmable interface to a programming station operated by a system user;
   operating the programming station to configure the programming of the programmable interface to provide a cumulative total of a selected device parameter to the transmitter; and
   coupling the programmable interface between the medical asset and the transmitter.

26. The method as recited in claim 25, further comprising the act of transmitting a unique identifier for the transmitter with the data from the device.

27. The method as recited in claim 25, further comprising:
   reconnecting the programmable interface to the programming station; and
   operating the programming station to reconfigure the programming of the programmable interface to provide the data in a different configuration selected by the system user.

28. The method as recited in claim 25, wherein operating the programming station comprises establishing an interval that a medical asset parameter is to be monitored by the programmable interface.

* * * * *